(12) United States Patent
Wang et al.

(10) Patent No.: US 10,600,029 B2
(45) Date of Patent: Mar. 24, 2020

(54) GRAPHICAL USER INTERFACES WITH CRITERIA BASED ENTITY RANKING

(71) Applicant: Microsoft Technology Licensing, LLC, Redmond, WA (US)

(72) Inventors: Chen Wang, Sunnyvale, CA (US); Luwei Zhang, San Francisco, CA (US); Weizhen Wang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 558 days.

(21) Appl. No.: 15/339,541

(22) Filed: Oct. 31, 2016

(65) Prior Publication Data
US 2018/0121522 A1    May 3, 2018

(51) Int. Cl.
*G06Q 10/10* (2012.01)
(52) U.S. Cl.
CPC ................. *G06Q 10/1053* (2013.01)
(58) Field of Classification Search
CPC ........... G06Q 10/1053; G06Q 10/0631; G06Q 10/1091; G06Q 10/067
USPC ......................................................... 707/733
See application file for complete search history.

(56) References Cited

U.S. PATENT DOCUMENTS

| | | | | |
|---|---|---|---|---|
| 2011/0016056 A1* | 1/2011 | Hargroder | ............ | G06Q 10/10 705/325 |
| 2011/0161137 A1* | 6/2011 | Ubalde | ............ | G06Q 30/0205 705/7.34 |
| 2014/0025442 A1* | 1/2014 | Goodson | ............ | G06Q 30/02 705/7.39 |
| 2014/0214943 A1* | 7/2014 | Shapero | ............ | H04L 51/32 709/204 |
| 2014/0297492 A1* | 10/2014 | Hollas | ............ | G06Q 10/0635 705/35 |
| 2016/0379170 A1* | 12/2016 | Pande | ............ | G06Q 10/06 705/321 |
| 2018/0101771 A1* | 4/2018 | Schwarm | ............ | G06N 5/022 |

\* cited by examiner

*Primary Examiner* — Shahid A Alam
*Assistant Examiner* — Alicia M Antoine
(74) *Attorney, Agent, or Firm* — Schwegman Lundberg & Woessner, P.A.

(57) ABSTRACT

Disclosed in some examples are methods, systems, devices, and machine readable mediums for calculating an entity potential score for an entity that meets a defined entity selection criteria. The entity potential score quantifies an estimated likelihood that the entity will be successful in a predetermined timeframe by meeting predefined entity success criteria. Information on the entity may be determined (e.g., employee information, industry, financial information), various component subscores may be calculated and an entity potential score may be calculated for the entity. This entity potential score may be presented to one or more members of the network accessible computer-based service. For example, the entity potential score may be displayed along with a web-page describing the entity. The entity potential score may be searchable such that a user may specify a maximum, minimum, or range of entity potential scores as a search criteria for a search for entities.

15 Claims, 8 Drawing Sheets

GRAPHICAL USER INTERFACES WITH CRITERIA BASED ENTITY RANKING

TECHNICAL FIELD

Embodiments pertain to improved computer processing techniques. Some embodiments relate to improved graphical user interfaces (GUIs) displaying criteria based entity scoring and ranking. Some embodiments relate to improved GUIs delivered through network accessible computer based services.

BACKGROUND

More and more people are looking for work opportunities in startup entities (e.g., organizations, companies, or the like) over more traditional corporate entities in recent years. This is because startups may offer more responsibility and opportunity. In return, the expanded responsibility and abundant project opportunities can push a young professional to grow faster. In addition, people may end up with a large financial reward if the startup finally succeeds (i.e being acquired or obtaining stock through an Initial Public Offering (IPO)).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
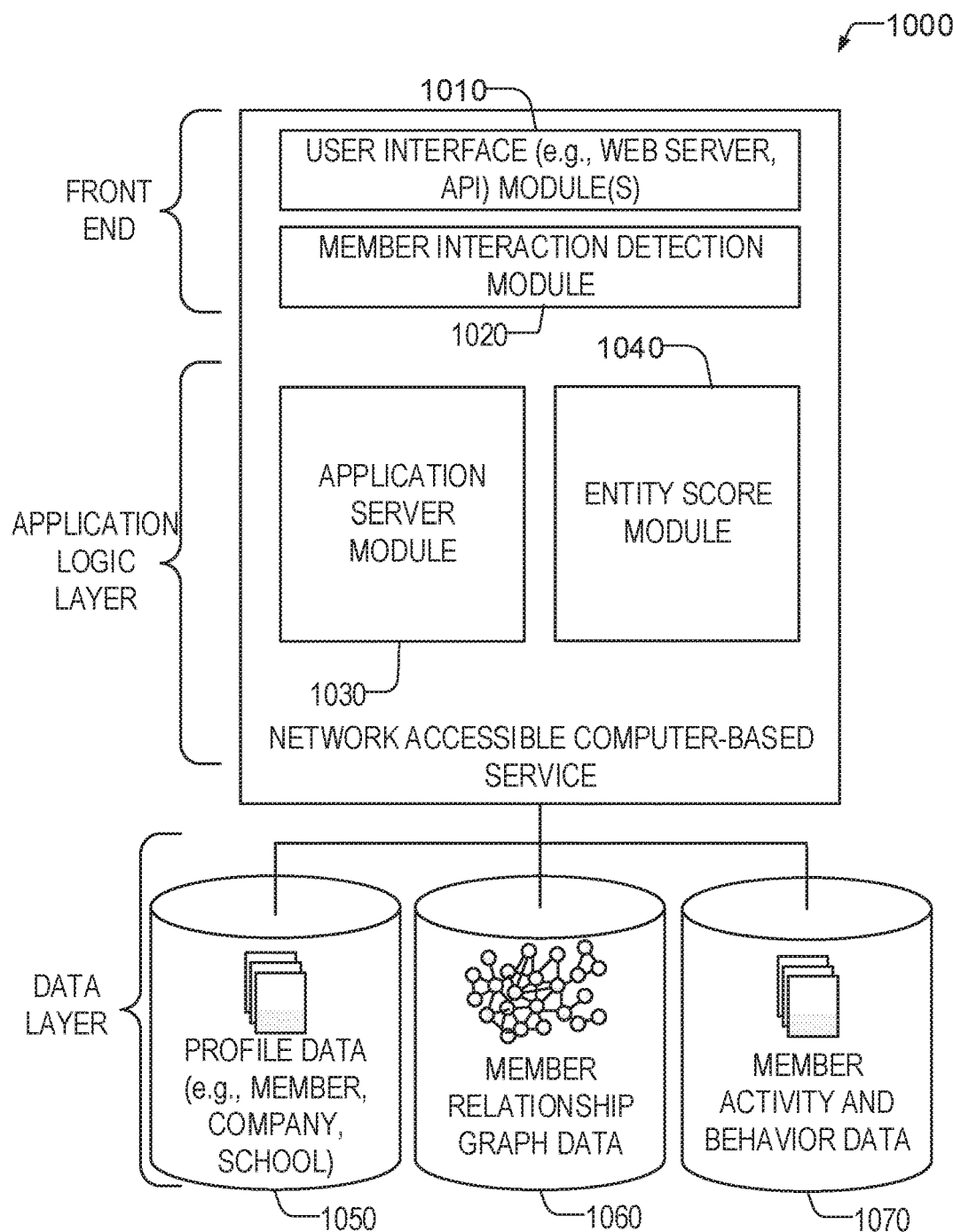
FIG. 1 is a block diagram showing the functional components of a network accessible computer-based service according to some examples of the present disclosure.

The small size and limited public information about many startups prevents easy identification and evaluation of these startups. Because of these challenges, job seekers may struggle to find attractive and promising startups and many job seekers have joined unsuccessful startups and regret their decisions. From the startup's point of view, the lack of information about their entity may make it difficult to attract and recruit talented individuals.

Data from network accessible computer-based services (e.g., a social networking service) may be utilized to assist members of these services to select and find startup entities that offer the greatest potential for success. For example, the computer-based services may have information on the startup entities such as employee information, funding information, historical information, revenue information, activity information (which describes activities of members with respect to an online presence of the entity), and the like. This information may be utilized by the network accessible computer-based service to provide job-seekers with an informed choice about which startup entities are likely to be successful. This data may be entered by the startups and by the employees of those startups as part of a member profile of the startup entity on the network accessible computer-based service.

Disclosed in some examples are methods, systems, devices, and machine readable mediums for providing enhanced GUIs which display one or more visual indications of promising entities (e.g., startups). For example, the system may calculate an entity potential score for one or more entities that meet predetermined entity selection criteria. The entity potential score quantifies an estimated likelihood that an entity will be successful in a predetermined timeframe by meeting predefined entity success criteria. This entity potential score may be presented to one or more members of the network accessible computer-based service. For example, the entity potential score may be displayed as part of a web-page describing the entity. In other examples, the entity potential score may be displayed as part of a GUI produced by a dedicated application that interfaces with the network accessible computer-based service. The entity potential score may be searchable such that a user may specify a maximum, minimum, or range of entity potential scores as a search criteria when searching for entities. In some examples, the entity potential score may be used to rank the entities meeting the predetermined entity selection criteria.

An entity, as used herein, is any organization formed or operated under one or more legal statutes of a state, territory, country, or region. Examples include corporations, partnerships, non-profits, charities, trade unions, governmental organizations, and the like. While the systems, methods, and machine readable mediums are described herein to calculate an entity potential score to solve the problem of finding good startup entities, one of ordinary skill in the art with the benefit of the present disclosure will appreciate that the methods, systems, and machine readable mediums are equally applicable to other entities. Thus, the disclosed methods, systems, and machine readable mediums can be used to calculate an entity potential score for any entity meeting an entity selection criteria. In general, a non-exclusive list of criteria for selecting entities may include one, more, or all of the following:

- Number of employees
- Revenue
- Profits
- Funding amount
- Growth of the number of employees, revenues, profits, and funding amount
- Funding sources (e.g., if the entity is funded by another entity that is on a list of entities that fund startups)
- Losses
- Years in business
- Industry
- Products
- Geographical region the entity serves, has offices in, or hires from Inclusion on a list of entities derived by a third party or derived by an administrator of the network accessible computer-based service A startup entity may be defined as a newly emergent, fast growing business that aims to meet a marketplace need. Growth may be defined in terms of revenues, number of employees, or both. Entity selection criteria may be chosen to select startup entities. For example, one or more of the above list of entity selection criteria may be utilized to select startup entities. One example entity selection criteria that may select startup entities may be an entity that has been in operation for less than seven years and has less than 500 employees. One of ordinary skill in the art with the benefit of the present disclosure will appreciate that other numbers of years and number of employees may be utilized without departing from the scope of the present disclosure. For example, a company that has been in operation for less than five years and has less than 1000 employees. Other selection criteria may utilize entity growth. For example, a startup may be selected by criteria that focuses on revenues—such as selection of entities whose revenues have increased by over a predetermined percentage over a predetermined period of time.

Entities meeting the entity selection criteria may be scored based upon an estimated likelihood that the entity will be successful within a predetermined timeframe. Success may be judged based upon meeting predefined success criteria. In some examples, the predefined success criteria may be a subjective indication of the entity's success. In other examples, the predefined success criteria may be defined by one or more metrics such as:

Growth in revenues, profits, territory served, products, employees
Number of employees
Profits
Revenues
Funding obtained
Mergers or acquisitions
Years in business
Quality of talent attracted For example, one example success criteria may be to grow revenues 150% from a first period of time to a second period of time (which is later than the first period of time).

In some examples, the entity potential score may be calculated based upon one or more features of the entity that are predictive of its ability to meet the predetermined success criteria. In some examples, the predetermined success criteria may not be explicitly provided or stated. That is, the entity potential score may be determined based upon a subjective belief of factors that are likely to make an entity successful. In other examples, the entity potential score may be derived based upon a calculated importance of one or more features of the company to achieving these criteria.

For example, one feature that is thought to be correlative of success may be the quality of talent (e.g., employees) associated with the entity. Talent quality may be judged based upon a number of factors including education and previous working experience. Education may be judged based upon the educational institution attended. Previous working experience may be judged based upon the previous entities that the person worked for. For example, an employee prestige score may be generated which may be based upon previous work experience prestige score and an educational institution prestige score.

For example, educational prestige score may be calculated by assigning a predetermined number of points to an educational institution that an individual associated with the entity has attended. The predetermined number of points may be assigned based upon a ranking of the educational institution automatically by the network accessible computer-based service, by a third party, or by an administrator of the social networking service. For example, the network accessible computer-based service may retrieve (e.g., scrape a website or download using an Application Programming interface (API)) rankings from a third party that ranks educational institutions relative to each other. In other examples, an administrator of the network accessible computer-based service may enter in the rankings that may be determined by the administrator, or may be determined from a third party (e.g., a magazine, a journal, a newspaper, and the like). The predetermined number of points may be an inverse of the ranking (e.g., higher points for higher ranked schools), or may be bucketed (e.g., 10 points for schools in the top ten, 5 points for schools in the top 20, 3 points for schools in the top 50 and 2 points for all other schools).

As noted, in some examples, the network accessible computer-based service may automatically rank the educational institutions. This may be done using data that it has collected about the educational institutions. In some examples, it may rank the educational institution based upon a count of the number of members that report having attended the educational institution in their member profiles and who are considered successful. For example, the educational institution score may be based a ratio of successful members to other members.

Members who are considered successful may be defined as members who achieve a certain seniority, members who fill certain leadership roles (e.g., CEO, CFO, etc. . . . ), achieve a certain salary, members who are employed by other entities considered successful, and the like. For example, a point value may be awarded based upon predefined achievements of the member (e.g., based upon one or more of the member's title, salary, employment by certain entities, and the like). If the total points awarded to the member is above a predetermined threshold, then the member may be considered successful and if the member is not above the predetermined threshold than the member may not be utilized as a successful member in the calculations. Institutions may then be ranked based upon their ratio of successful members to other members.

Points may be assigned as the educational institution prestige score based upon percentile groupings of educational institutions (e.g., the top 10% of schools receives a first point value, 11%-20% receives a second point value lower than the first, and so on). If a user attended multiple educational institutions, then a highest score of all the user's attended educational institutions may be used as the educational institution prestige score. In other examples, an average score of all the user's attended educational institutions may be used as the educational institution prestige score.

Similarly, a predetermined number of points may be assigned to a previous entity for a user's work history based upon a prestige ranking of the previous entity. The prestige ranking may be determined by a third party, by an administrator of the network accessible computer-based service, or automatically by the network accessible computer-based service. In some examples, the ranking reflects a level of prestige or desirability of the entity. For example, LinkedIn may be ranked high, whereas other less successful entities may not be rated as high. The network accessible computer-based service may retrieve (e.g., scrape a website or download using an Application Programming Interface (API)) from a third party that ranks entities relative to each other. In other examples, an administrator of the network accessible computer-based service may enter in the rankings that may be determined by the administrator, or may be determined from a third party (e.g., a magazine, a journal, a newspaper, and the like). The predetermined number of points may be an inverse of the ranking (e.g., higher points for higher ranked entities), or may be bucketed (e.g., 10 points for entities in the top ten, 5 points for entities in the top 20, 3 points for entities in the top 50 and 2 points for all other entities).

As noted, in some examples, the network accessible computer-based service may automatically determine the entity's prestige score for the previous work experience prestige score. For example, the prestige score may be determined based upon one or more of: the number of members who "follow" or like the entity's profile on the network accessible computer-based service, the number of employees of the entity, the amount of content shared on the network accessible computer-based service that is interacted with (e.g., re-shared, commented on, liked, viewed) by other members of the network accessible computer-based service, and the like. For example, points may be awarded for each follow, like, re-share, comment, etc. . . . An entity's score may then be the total score. Entities may then be ranked based upon scores. In other examples, entities may be automatically ranked based upon entity selection criteria (e.g., revenue, profits, # of employees, and the like).

Points may be assigned as the previous work experience prestige score based upon percentile groupings of entities (e.g., the top 10% of entities receives a first point value, 11%-20% receives a second point value lower than the first, and so on). If a user worked for multiple entities in the past, then a highest score of all the entities that the user worked for may be used as the previous work experience prestige score. In other examples, an average prestige score for the previous entities the user worked for may be used as the previous work experience prestige score.

In some examples, to calculate an employee prestige score for a particular employee of an entity, the previous work experience prestige score and the educational institution prestige score may be utilized. For example, the previous work experience prestige score and the educational institution prestige score may be added together. In some examples, a weighted summation may be utilized which may weight each component differently depending on a perceived importance of a particular feature. For example, the educational institution prestige score may be weighted more heavily than the previous work experience prestige score. In some examples, the weighting may be dynamic. For example, if the employee has been out of school a long time, the educational institution prestige score may be weighted less heavily than the previous work experience prestige score.

Other algorithms and other factors may be utilized instead of or in addition to the previously discussed weighted summation of the educational prestige score and the previous work experience prestige score to determine an employee prestige score. For example, in some network accessible computer-based services, the services designate certain members as influencers that comprise recognized thinkers, leaders, and innovators. In some examples, an employee's social distance (e.g., the number of social networking connections between the employee and the influencer) to an influencer (including being an influencer themselves) may increase or decrease an employee's prestige score a predetermined amount (the predetermined amount based upon the social distance).

In some network accessible computer-based services, employees may indicate in their member profiles, or be assigned by the computer-based services (based upon their member profiles), one or more skills that they possess. If the employee possesses skills considered necessary or desirable for an entity in the particular industry that the employee works for, the employee's prestige score may be increased. Similarly if the employee does not possess skills considered necessary or desirable for an entity in the particular industry that the employee works for, the employee's prestige score may be decreased. The skills considered necessary or desirable may be predetermined by an administrator of the computer-based services or may be determined based upon the top predetermined number of skills across all entities in a particular industry. For example, the skills of the employees of entities in the industry may be determined and counted. A predetermined number of skills with the highest number of employees possessing those skills may be considered the skills necessary or desirable.

One or more of these factors may be combined in a variety of ways to produce an employee prestige score. For example, points may be assigned to each of the features (such as the features described above) used in determining an employee prestige score. The points may be assigned based upon how closely the employee matches an ideal employee. For example, if the employee has all or nearly all the skills in the necessary or desirable skills list, the employee's skills feature score may be higher than an employee that has fewer of the skills in the list. Similarly, an employee that is closer in connection degree on a social graph to an influencer may have a higher influencer closeness feature than other employees who are not as close. The educational institutions and the previous experiences of the employees as previously described may also be features of these calculations. One or more of the above features may then be combined using a weighted summation algorithm to produce an employee prestige score.

To determine an entity potential score for an entity, the employee prestige scores may be utilized. For example, the employee prestige scores of a set of one or more employees of the entity may be utilized. The set may include some (but not all) employees of the entity or may include all of the employees of the entity. In some examples, the entity potential score may be an average of all the employees' prestige scores in the set. In other examples, a weighted average may be utilized that may weigh each employee's prestige score by the importance of the employee. For example, a founder, president, CEO or other executive or high leadership may be weighted higher than less senior leadership.

Other information may be utilized in addition to or in lieu of the employee prestige score such as funding sources (e.g., predetermined points may be assigned based upon funding sources and amounts as determined by predetermined lists of funding sources), location, industry (which may vary based upon current industry market conditions), revenue, profits, losses, and the like. This information may be obtained from databases of the network accessible computer-based service or third party services (e.g., market information services).

In still other examples, the entity potential score may be determined based upon one or more machine learning algorithms. For example, training data comprising the historical information known about entities (including employee information) taken when those entities match the given entity selection criteria (e.g., when current entities were in the startup phase) by the network accessible computer-based service along with the actual later outcomes of the entity as classified into a plurality of groups may be used to build a machine learning model. Example group classifications may be "highly successful," "moderately successful," "average success," "below average success," and "not successful," based upon the entity meeting or not meeting the predetermined entity success criteria. In other examples, the classifications may be manually applied by an administrator of the network accessible computer-based service. For example, information known about GOOGLE® when it was in its startup phase (e.g., within seven years of its founding with less than 500 employees) may be used as training data which may be manually (or automatically) labelled as a "highly successful" entity.

The machine learning model may then learn which of the items of information are important and predictive of success. Once the model is trained, it can be applied to categorize a new entity based upon the same or similar information about the new entity. For example, the machine learning algorithm may learn a set of one or more weights for the features. The weights indicate a learned importance of the feature to the classification of the machine learning algorithm.

The historical information and new information of an entity that is to be classified may be any of the features described above with respect to the non-machine learning examples. For example, employee prestige scores of employees, skills of employees, closeness to an influencer, funding sources (e.g., predetermined points may be assigned based upon funding and amount), location, industry (which may vary based upon current industry market conditions), revenue, profits, losses, and the like.

The entity potential score may be utilized in a number of applications. For example, members of the network accessible computer-based service may utilize the entity potential score as search criteria when searching for an entity. In other examples, the entity potential score may be presented as part of a GUI profile page of the entity on the network accessible computer-based service. Entities may be ranked based upon the entity potential score and a top 10, top 25, top 50, or the like may be presented on a webpage provided by the network accessible computer-based service. Entities may also have access to information on how their potential score was calculated and what steps they can take to increase their potential score. For example, by hiring a member who possesses certain skills, by hiring members who have attended particular prestigious schools or who have prestigious backgrounds. Entities may be able to view the impact of hiring certain members on their entity potential score.

FIG. 1 is a block diagram showing the functional components of a network accessible computer-based service in the form of a social networking service 1000. As shown in FIG. 1, a front end may comprise a user interface module (e.g., a web server) 1010, which receives requests from various client-computing devices, and communicates appropriate responses to the requesting client devices. For example, the user interface module(s) 1010 may receive requests in the form of Hypertext Transport Protocol (HTTP) requests, or other network-based, application programming interface (API) requests (e.g., from a dedicated social networking service application running on a client device). In addition, a member interaction and detection module 1020 may be provided to detect various interactions that members have with different applications, services and content presented. As shown in FIG. 1, upon detecting a particular interaction, the member interaction and detection module 1020 logs the interaction, including the type of interaction and any meta-data relating to the interaction, in the member activity and behavior database 1070.

An application logic layer may include one or more various application server modules 1030, which, in conjunction with the user interface module(s) 1010, generate various graphical user interfaces (e.g., web pages) with data retrieved from various data sources in the data layer. With some embodiments, application server module 1030 is used to implement the functionality associated with various applications and/or services provided by the social networking service as discussed above. Application layer may include an entity scoring module 1040 for gathering data and making entity potential score calculations.

The social networking service 1000 may also include a database 1050 for storing profile data, including both member profile attributes as well as profile data for various organizations (e.g., companies, schools, etc.). Consistent with some embodiments, when a person initially registers to become a member of the social networking service 1000, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history (including job title, responsibilities, dates of employment, company name, and the like), skills, professional organizations, and so on. This information is stored, for example, in the database 1050. Similarly, when a representative of an organization initially registers the organization with the social networking service 1000, the representative may be prompted to provide certain information about the organization. This information may be stored, for example, in the database 1050, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Information describing the various associations and relationships, such as connections that the members establish with other members, or with other entities and objects are stored and maintained within a social graph in the social graph database 1060. Also, as members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 1 by the member activity and behavior database 1070.

With some embodiments, the social networking service 1000 provides an application programming interface (API) module with the User Interface module 1010 via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Figure 2:
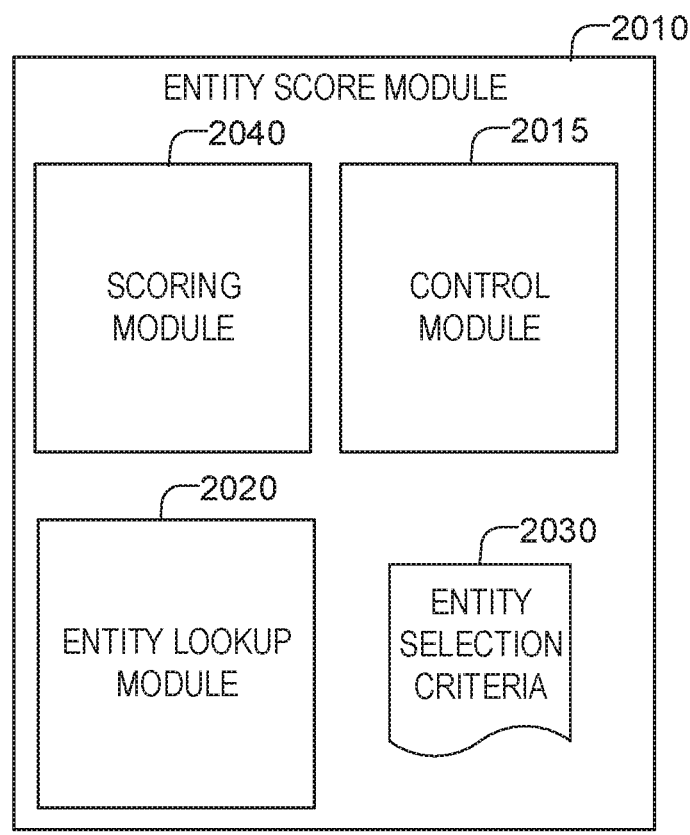
FIG. 2 shows a schematic of an entity score module according to some examples of the present disclosure.

FIG. 2 shows a schematic of an entity score module 2010 according to some examples of the present disclosure. In some examples, the entity score module 2010 may be an example implementation of entity score module 1040 of FIG. 1. Control module 2015 may control the process of producing entity potential scores for one or more entities. Control module 2015 may calculate entity potential scores for one or more entities meeting entity selection criteria 2030 periodically or on-demand. Entity selection criteria 2030 may be entered by a user of the network accessible computer-based service, an administrator of the network accessible computer-based service, or the like.

Entity lookup module 2020 may utilize the entity selection criteria 2030 to determine entities that are known to the network accessible computer-based service that match the entity selection criteria 2030. Entities known to the network accessible computer-based service are entities that have registered with the network accessible computer-based service or entities which employees have reported working for to the network accessible computer-based service. Entity lookup module 2020 may also determine which members of the network accessible computer-based service report that they work for the various entities determined to match the entity selection criteria and may retrieve their member profiles. Entity lookup module 2020 may also determine various other information about the entity from one or more third party sources such as an entities website or a third party website which may have information about the entities.

Scoring module 2040 may take the information about each entity and generate an entity potential score. The entity potential score may be generated based upon one or more of the methods previously described. For example, the scoring module 2040 may calculate employee prestige scores for employees who report that they work for the entity. The entity potential score may be an average employee prestige score for employees who work at the entity. In some examples, in addition to, or instead of using the employee prestige scores the entity potential score may factor in other features such as the degree the employees are connected to influencers and the skills possessed by the employees in comparison to desired or required skills of the industry the entity is in. In yet other examples, the scoring module 2040 may be a machine learning model.

Figure 3:
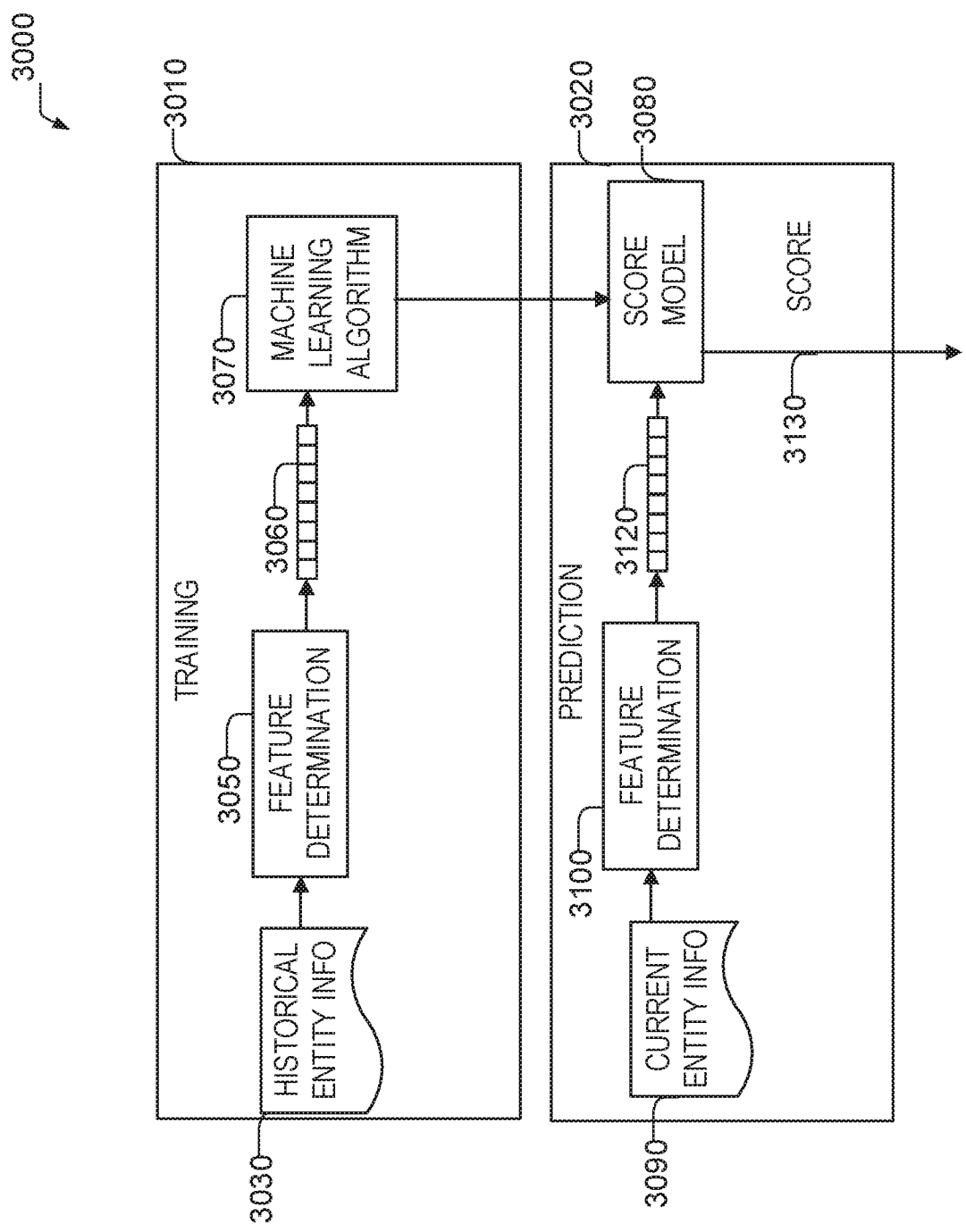
FIG. 3 shows an example machine learning module according to some examples of the present disclosure.

FIG. 3 shows an example machine learning module 3000 according to some examples of the present disclosure. Machine learning module 3000 is one example component of scoring module 2040 from FIG. 2. Machine learning module 3000 utilizes a training module 3010 and a prediction module 3020. Training module 3010 feeds historical entity information 3030 into feature determination module 3050. The historical entity information 3030 includes previous entity information labeled with a success score or categorization that is indicative as to how closely the entity meets the predetermined entity success criteria.

The entity information may be from when the entity was just starting up prior to when it became successful. For example, the entity information may be taken at a time when the entity met the entity selection criteria (e.g., when the entity was a startup). Entity information may include any of the abovementioned information used to produce an entity potential score, including: employee information (education, experience, age, title, and salary), number of employees, revenue, profits, funding amount, funding sources, growth, years in business, industry, products, geographical location information, and the like. Entity information may also include using market information of the industry the entity is in. Example market information may include market size, entity information of competitor entities, market growth, expected market growth (as determined by a third party such as a financial analyst service), and the like.

An entity's success score or categorization on the other hand may be judged based upon how closely the entity met the entity success criteria from a more recent period (e.g., now, an average taken over a recent period of time, and the like). Example entity success criteria include revenue, profits, longevity, number of employees, whether or not it was purchased, whether or not it acquired other entities, whether it received investments or loans, and the like. The entity may be automatically scored against these criteria by using a weighted summation algorithm that assigns points to an entity based upon meeting (or not meeting) these criteria. For example, if a company's revenue falls within a first revenue range, then a first number of predetermined points is assigned. If a company's revenue falls within a second range (that is higher than the first range) then a second number of predetermined points (the second number greater than the first) is assigned and so on. Similarly, if a company has a number of employees that is between a first range, then a third number of predetermined points (which may or may not be the same as the first or second numbers) may be assigned. If a company has a number of employees that is between a second range (that is higher than the first range) then a fourth predetermined number of points may be assigned (the fourth predetermined number higher than the third). These points may then each by multiplied by a predetermined weighting factor such that each individual criteria's contribution is weighted relative to other's contributions to create a final success score. The final success score may be used to assign the entity to one or more categories, such as "highly successful," "moderately successful," "average success," "below average success," and "not successful." For example, highly successful entities may be defined as entities with a final success score between a first predetermined range, moderately successful entities may be defined as entities with a final success score between a second predetermined range, and so on. In other examples, an administrator of the network-accessible computer-based service may manually assign the category to the entity. In still other examples, the training data is not labelled with a category, but instead is labeled with the final success score.

Feature determination module 3050 determines one or more features 3060 from this information. Features of the feature vector 3060 are a set of the information input and is information determined to be predictive of a response. Features may be all the entity information the network accessible computer based service has about the entity or in some examples, may be a subset of all the entity information. In examples in which the features are a subset of the entity information, a predetermined list of which entity information is included as a feature may be utilized. Feature vectors may be built by reading the entity information from a profile of the entity or a profile of the entity that existed in a previous timeframe. These profiles may be stored in database 1050. The machine learning algorithm 3070 produces a score model 3080 based upon the feature vector 3060 and the success score.

In the prediction module 3020, the current entity info 3090 may be input to the feature determination module 3100. Feature determination module 3100 may determine the same set of features or a different set of features as feature determination module 3050. In some examples, feature determination module 3100 and 3050 are the same module. Feature determination module 3100 produces feature vector 3120, which are input into the score model 3080 to generate a predicted success score 3130.

Features of the feature vector 3120 are a set of the information input and is information determined to be predictive of a response. Features may be all the entity information the network accessible computer based service has about the entity or in some examples, may be a subset of all the entity information. In examples in which the features are a subset of the entity information, a predetermined list of which entity information is included as a feature may be utilized. Feature vectors may be built by reading the entity information from a profile of the entity or a profile of the entity that existed in a previous timeframe. These profiles may be stored in database 1050. Features used to produce feature vector 3060 may be the same or different as features used to produce feature vector 3120.

The training module 3010 may operate in an offline manner to train the score model 3080. The prediction module 3020, however, may be designed to operate in an online manner.

It should be noted that the score model 3080 may be periodically updated via additional training and/or user feedback. For example, additional historical entity info 3030 may be collected as entities experience launches, successes, and failures.

The machine learning algorithm 3070 may be selected from among marry different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 3010. In an example embodiment, a linear regression model is used and the score model 3080 is a vector of coefficients corresponding to a learned importance for each of the features in the vector of features 3060, 3120. To calculate a score, a dot product of the feature vector 3120 and the vector of coefficients of the score model 3080 is taken.

Figure 4:
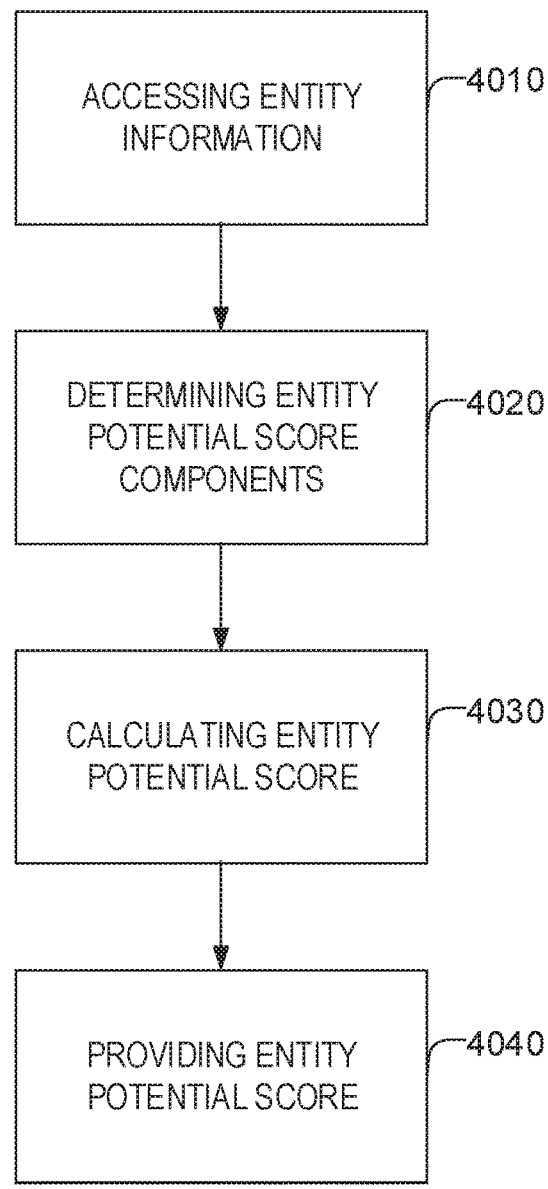
FIG. 4 shows a flowchart of a method of providing an enhanced GUI is shown according to some examples of the present disclosure.

Turning now to FIG. 4, a flowchart of a method 4000 of calculating an entity potential score is shown according to some examples of the present disclosure. At operation 4010 the network accessible computer-based system may access entity information. For example, the network accessible computer-based system may access profile information for the entity and for one or more employees of the entity in one or more data storage devices (e.g., profile data in database 1050, graph data in member relationship graph database 1060, and activity and behavior information in member activity and behavior database 1070). Entity information may be any information stored by the network accessible computer-based service about the entity and includes information about the entity itself (e.g., locations, industry, revenue, earnings, specialties, size, year founded, content posted by the entity), information about employees of the entity (e.g., length of employment, job title, education, previous experience, skills, skill rating, skill ranking, salary information, and the like), and the like.

Employees of an entity may be determined by consulting member profile data of the network accessible computer-based service. For example, employees may report on their member profiles that they work for the entity. Thus in operation 4010, both a profile for the entity may be retrieved, but also profiles may be searched to retrieve employee profiles where members of the network accessible computer-based service report that they work for the entity. In some examples, third party network accessible computer-based services may also be searched for entity information. For example, network based financial news and information services. These services may provide financial information about the entity as well as news and other information.

At operation 4020, a variety of entity potential score components may be determined. For example, employee educational prestige and previous work experience prestige scores may be calculated and summed to create employee prestige scores. In examples in which machine learning algorithms are utilized one or more features may be extracted from the entity information obtained at operation 4010. In these examples feature extraction may be the creation of a feature vector from the entity information.

At operation 4030 an entity potential score may be calculated. For example, the employee prestige scores of one or more (or all) of the employees of the entity may be averaged or summed. In other examples, the features determined at operation 4020 may be used as input into the machine learned model to produce an entity potential score. An entity potential score may be a numerical indicator of a likelihood that the entity will meet predetermined entity success criteria. In other examples, the entity potential score may be a classification of a likelihood that the entity meets predetermined entity success criteria (e.g., the entity may be classified as likely to be "highly successful," "moderately successful," have "average success," "below average success," or be "not successful." Calculating the entity potential score in some examples may include applying the feature vector to the machine learned model in examples involving machine learning.

At operation 4040 the entity potential score may be provided to one or more users of the network accessible computer-based service. For example, it may be provided in one or more graphical user interfaces (GUI) provided by or populated by the network accessible computer-based service. In one example, the entity potential score may be returned in one or more GUI descriptors sent by the network accessible computer-based service to a user's computing device. A GUI descriptor (e.g., a web page) includes one or more files that, when rendered by an application on the user's computing device (e.g., a browser application), causes a GUI to be displayed according to the instructions in the GUI descriptor. GUI descriptors include files formatted using HyperText Markup Language (HTML), eXtensible Markup Language (XML), Content Style Sheets (CSS), or scripting languages such as Javascript. In other examples, entity potential scores may be sent as part of one or more data items that are used by a dedicated application executing on a user's computing device to render or a graphical user interface.

Figure 5:
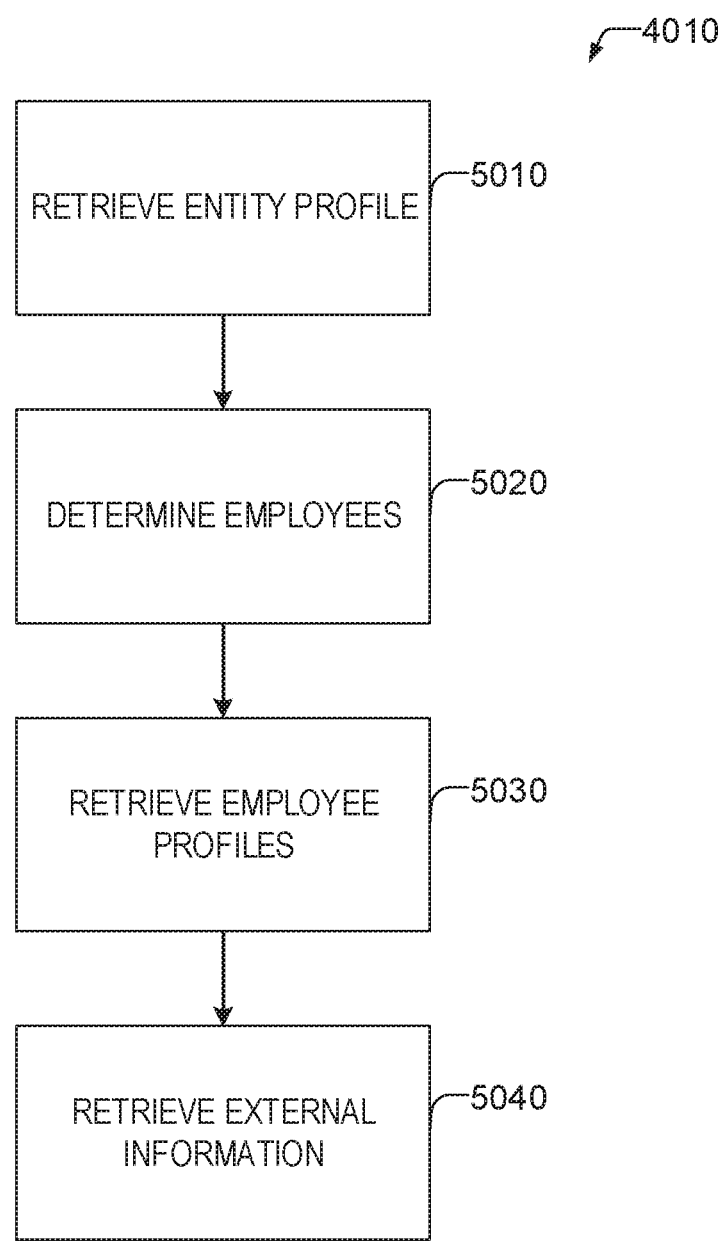
FIG. 5 shows a flowchart of a method of accessing entity information according to some examples of the present disclosure.

FIG. 5 shows a flowchart of a method of accessing entity information according to some examples of the present disclosure. FIG. 5 shows one example implementation of operation 4010 of FIG. 4. At operation 5010 the entity's profile with the network accessible computer-based service may be retrieved. For example, the profile may be retrieved from the profile data in database 1050 from FIG. 1. This profile may be created by an administrator or other person at the entity, or may be created by a non-affiliated individual, by an administrator of the network accessible computer-based service or automatically by the network accessible computer-based service.

At operation 5020 the employees of the entity may be determined. This may be determined by searching through member profiles of all members to find members that report that they work for the entity. In other examples, when an employee reports that they work for an entity, a connection is made in a social graph that describes that relationship. This connection is stored with the member relationship graph data in database 1060. Thus, determining the employees of an entity may be done by consulting this member relationship graph data database 1060.

At operation 5030 the member profiles of employees of the entity are retrieved from storage. For example, they may be retrieved from profile data in database 1050.

At operation 5040, any data may be retrieved from external sources if desired. For example, a financial information service may be consulted and financial information of the entity downloaded.

Figure 6:
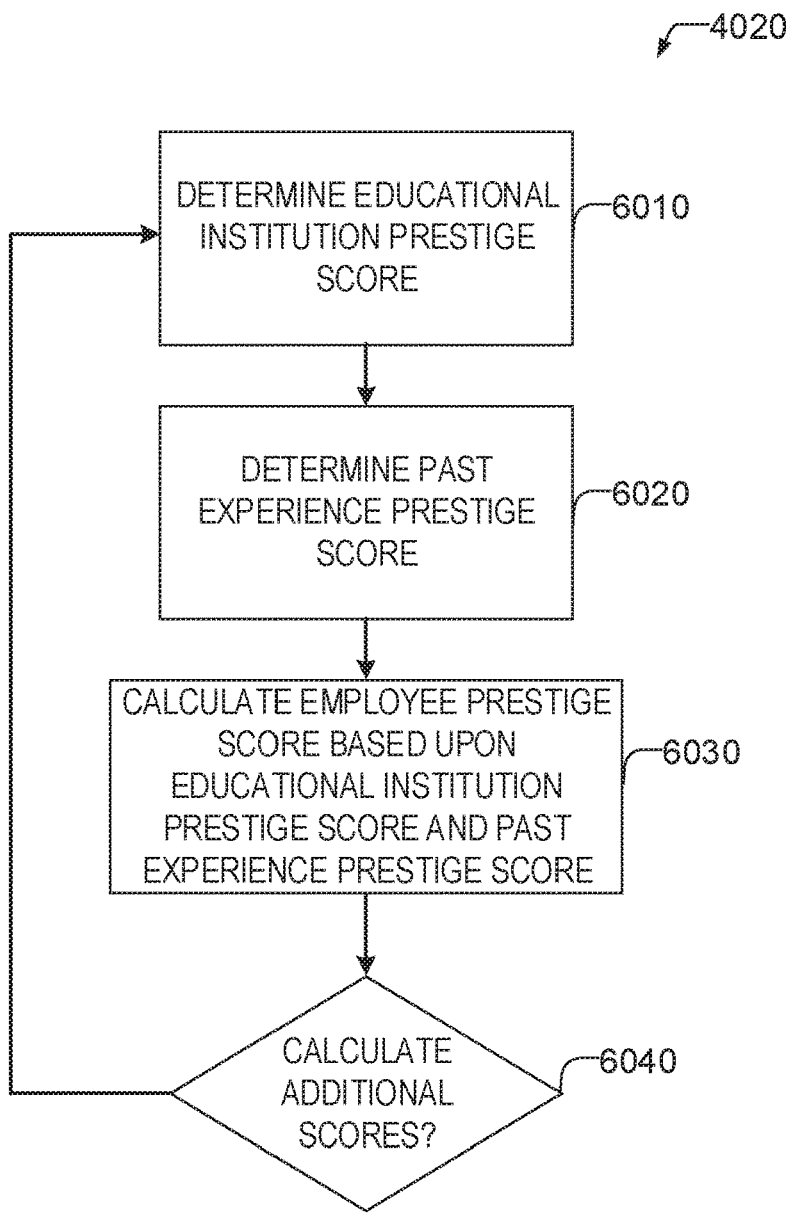
FIG. 6 shows a flowchart of a method of determining entity potential score components according to some examples of the present disclosure.

FIG. 6 shows a flowchart of an example method of determining entity potential score components according to some examples of the present disclosure. The method of FIG. 6 shows one example implementation of operation 4020 of FIG. 4. The operations of FIG. 6 may be performed for one or more (or in some examples, all) of the employees of the entity. At operation 6010 an educational institution prestige score may be calculated. Specific operations of calculating the educational institution prestige score were disclosed previously. For example, as explained previously, educational institutions may be assigned particular scores based upon a perceived prestige. This may be based upon a third party source (e.g., a ranking by a well-respected organization), or may be based upon an administrator of the network accessible computer-based service. For cases where an employee attended multiple educational institutions, the educational prestige score may be a total of all educational prestige scores, an average of all educational prestige scores, or a maximum of all the educational prestige scores.

At operation 6020 a previous work experience prestige score may be calculated based upon the employee's past work experience. Specific operations of calculating the educational institution prestige score were disclosed previously. For example, as previously explained, for each previous job an employee has had, the entity the employee worked for may be scored. Each entity may be scored based upon a predetermined list of entities with a predetermined point value for each entity on the list. In some examples, only certain entities may be awarded points. In other examples, a default point value may be awarded for companies not on the list. The point value for a company may be determined subjectively, or objectively using one or more metrics (e.g., growth, revenue, profits, and the like). For employees with multiple past work experiences, the previous work experience prestige score may be a total of all the prestige scores for all entities, an average of all the prestige scores, or a maximum of all the prestige scores.

At operation 6030 an employee prestige score may be calculated based upon the educational institution prestige score and the previous work experience prestige score. In some examples, this may include a weighted summation where one of the educational institution prestige score and the previous work experience prestige score may be weighted differently (or the same) depending on a predetermined weighting. At operation 6040, if the operation is to be repeated again on a different employee, control flow proceeds to operation 6010.

In examples in which a machine learning algorithm is used to produce the score, the operation of determining the entity potential score components 4020 may be the process of feature determination which may involve creating a feature vector (such as feature vector 3120) for inputting into the model using the determined features. Feature determination may be predetermined ahead of time by an administrator of the network accessible computer-based service. In some examples, feature determination may be to utilize all the information collected by the entity. In some examples, creating the feature vector involves converting information about the entity into one or more numbers or subscores. This may be done based upon a set of rules or formulas (e.g., a table). For example, an item of information (e.g., an attribute of the entity) may be converted to points based upon rules that award points based upon ranges of the attribute. For example, in the context of awarding points for entity size, an entity that has between 0 and 20 employees may be awarded a single point, an entity that has between 21 and 40 employees may be awarded two points, and so on.

Figure 7:
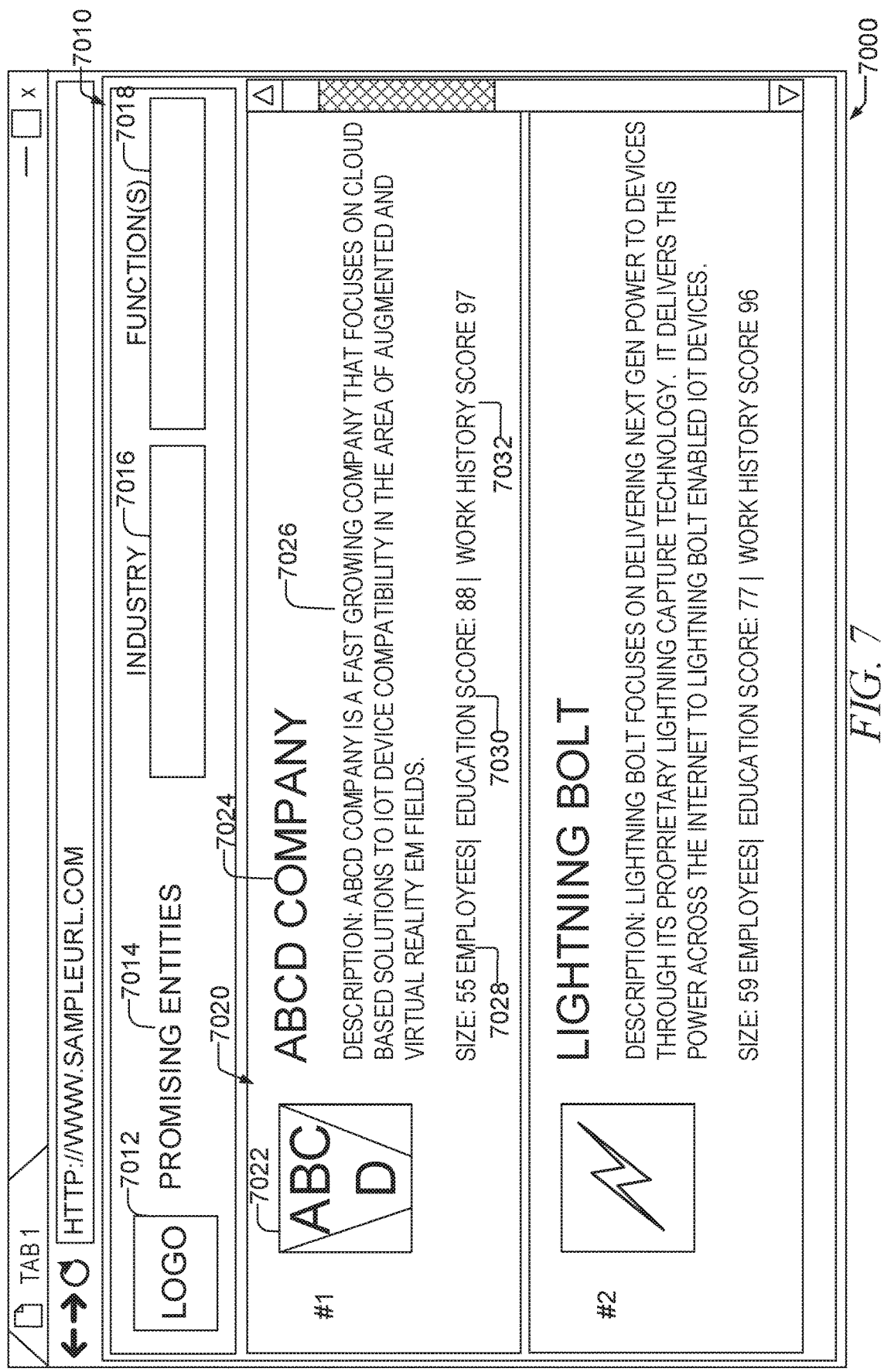
FIG. 7 shows an example GUI incorporating an entity potential score according to some examples of the present disclosure.

FIG. 7 shows an example GUI 7000 incorporating an entity potential score according to some examples of the present disclosure. A first area 7010 of the GUI shows a logo 7012 of the network accessible computer-based service (e.g., a social networking service), along with the title of the page "Promising Entities" at 7014. At the right of the first area 7010 are industry search box 7016 and function search box 7018 where users may filter the results of shown in a results panel 7020 by industry or function by typing in an industry or function. In some examples, the boxes may include auto completion functionality to auto complete a user's entered industry or function. In other examples, other boxes may be provided for inputting other search criteria. Results in the results panel 7020 will be updated based upon anything input into these boxes, Results panel 7020 lists promising entities sorted based upon their rank (the rank calculated based upon a comparison of their entity potential scores) and filtered based upon the industry and function boxes. A logo 7022, the name of the entity 7024, a description of the entity 7026, a size of the entity 7028, and subscores of the entity (7030, 7032) may be displayed in the results panel 7020. Other information about the entity may also be displayed. In the example of FIG. 7, the education prestige and past experience prestige subscores are broken out of the employee prestige subscores and averaged among all employees to provide a breakdown of the educational prestige and work history prestige scores for all employees for the entity.

Figure 8:
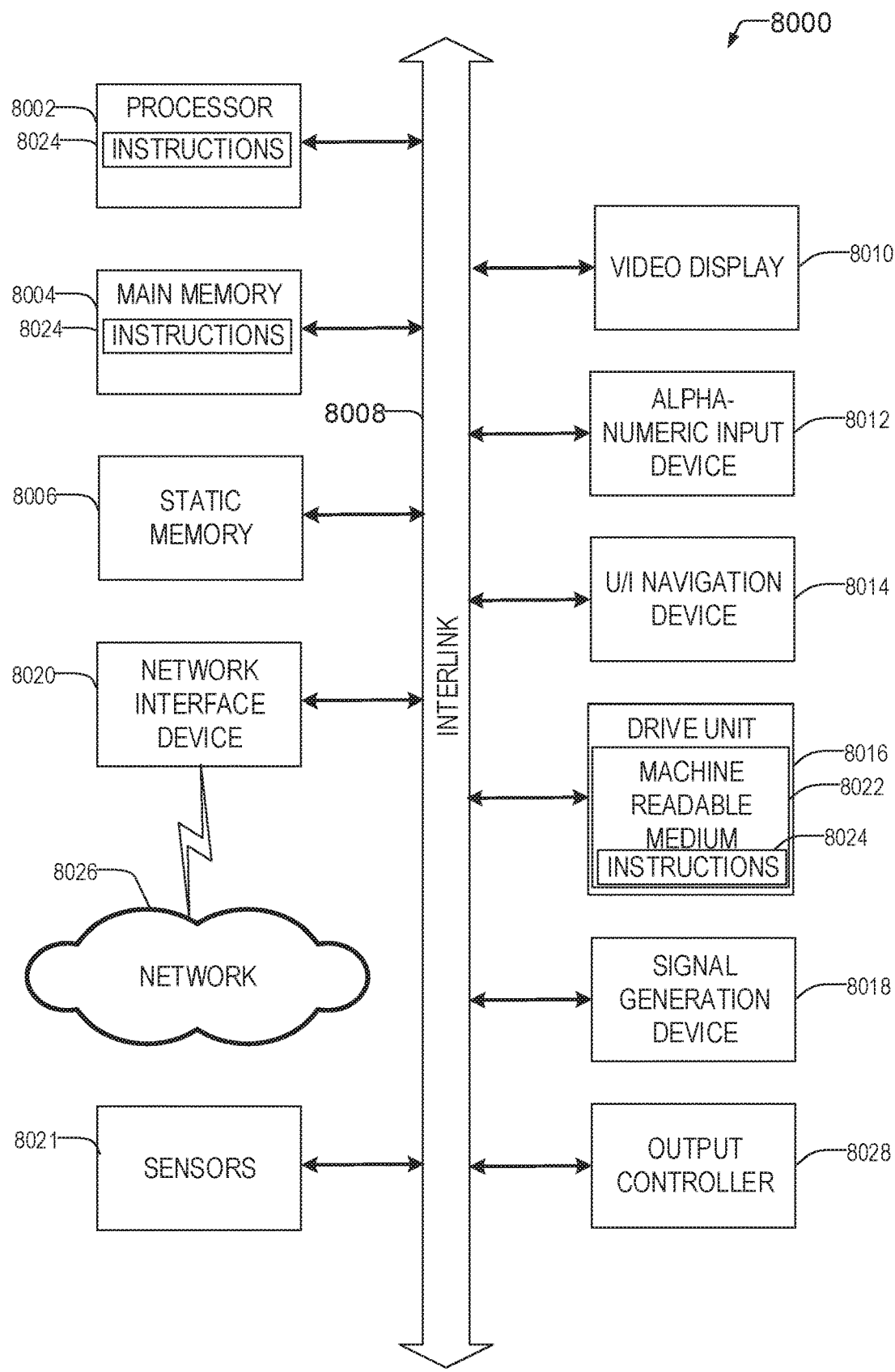
FIG. 8 is a block diagram illustrating an example of a machine upon which one or more embodiments may be implemented.

FIG. 8 illustrates a block diagram of an example machine 8000 upon which any one or more of the techniques (e.g., methodologies) discussed herein may perform. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. The machine 8000 may include or be configured to include the modules of FIGS. 1-3 and perform the methods of FIGS. 4-6 and render the GUI of FIG. 7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., (hive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless infrared(IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

What is claimed is:

1. A method for providing, using a network accessible computer-based service, Graphical User Interfaces (GUIs) that include a visual indication of a first entity's potential, the method comprising:
    at the network accessible computer-based service, using a processor:
        training a model using a machine-learning algorithm using a training data set comprising employee prestige scores for a plurality of entities not including the first entity and labeled with a degree of success of the plurality of entities;
        accessing member profiles of a set of one or more members of the computer-based service, each member of the set of one or more members indicating in their respective member profiles that they work for the first entity;
        calculating an employee prestige score for each respective member in the set based upon an educational institution attended by the respective member and past work experience attained by the respective member, the educational institution and past work experience determined based upon a respective member profile of the respective member;
        calculating an entity potential score for the first entity using the employee prestige scores of the employees in the set as input to the trained model, the entity potential score quantifying a predicted likelihood that the first entity meets predetermined entity successfulness criteria;
        receiving, through a GUI, a search request, the search request including a request for entities meeting an entity potential score criterion;
        determining that the entity potential score of the first entity meets the entity potential score criterion;
        providing the entity as part of a GUI displaying entities matching the entity potential score criterion; and
        wherein calculating the employee prestige score for each respective member in the set based upon the educational institution attended by the respective member and the past work experience attained by the respective member comprises, for each respective member in the set:
            determining an educational prestige score based upon point values specified for one or more educational institutions that the respective member reports having attended;
            determining a previous work experience prestige score as the maximum work experience prestige score over a plurality of entities that the respective member has worked for; and
            determining the employee prestige score for the respective member based upon the educational prestige score and the previous work experience prestige score.

2. The method of claim 1, wherein the set of one or more members of the network accessible computer-based service includes all members of the network accessible computer-based service that indicate in their respective member profiles that they work for the fit entity.

3. The method of claim 1, wherein determining the educational prestige score based upon point values specified for one or more educational institutions that the respective member reports having attended comprises:
    determining the educational prestige score for the respective member as the maximum educational prestige score over a plurality of educational institutions that the respective member has attended.

4. The method of claim 1, wherein calculating the entity potential score for the first entity using the employee prestige scores of the employees in the set as input to the trained model comprises:
    using an average of the employee prestige scores of all the employees in the set as input to the trained model.

5. The method of claim 1, wherein calculating the entity potential score for the first entity using the employee scores of the employees in the set as input to the trained model comprises:
    utilizing a funding source that is funding the entity as input to the model.

6. The method of claim 1, wherein the predetermined entity successfulness criteria comprises growth in at least one of: revenue, profits, or number of employees.

7. A non-transitory machine-readable medium for providing, using a network accessible computer-based service, Graphical User Interfaces (GUIs) that include a visual indication of a first entity's potential, the machine-readable medium comprising instructions, which when performed by a machine cause the machine to perform operations comprising:
    at the network accessible computer-based service, using a processor:
        training a model using a machine-learning algorithm using a training data set comprising employee prestige scores for a plurality of entities not including the first entity and labeled with a degree of success of the plurality of entities;
        accessing member profiles of a set of one or more members of the computer-based service, each member of the set of one or more members indicating in their respective member profiles that they work for the first entity;
        calculating an employee prestige score for each respective member in the set based upon an educational institution attended by the respective member and past work experience attained by the respective member, the educational institution and past work experience determined based upon a respective member profile of the respective member;
        calculating an entity potential score for the first entity using the employee prestige scores of the employees in the set as input to the trained model, the entity potential score quantifying a predicted likelihood that the first entity meets predetermined entity successfulness criteria;
        receiving, through a GUI, a search request, the search request including a request for entities meeting an entity potential score criterion;
        determining that the entity potential score of the first entity meets the entity potential score criterion;
        providing the entity as part of a GUI displaying entities matching the entity potential score criterion; and
        wherein calculating the employee prestige score for each respective member in the set based upon the educational institution attended by the respective member and the past work experience attained by the respective member comprises, for each respective member in the set:

determining an educational prestige score based upon point values specified for one or more educational institutions that the respective member reports having attended;

determining a previous work experience prestige score as the maximum work experience prestige score over a plurality of entities that the respective member has worked for; and determining the employee prestige score for the respective member based upon the educational prestige score and the previous work experience prestige score.

8. The machine-readable medium of claim 7, wherein the set of one or more members of the network accessible computer-based service includes all members of the network accessible computer-based service that indicate in their respective member profiles that they work for the first entity.

9. The machine-readable medium of claim 7, wherein the operations of determining the educational prestige score based upon point values specified for one or more educational institutions that the respective member reports having attended comprises:

determining the educational prestige score for the first member as the maximum educational prestige score over a plurality of educational institutions that the respective member has attended.

10. A system comprising:

a processor;

a memory communicatively coupled with the processor and comprising instructions, which when performed by the processor cause the system to perform operations comprising:

training a model using a machine-learning algorithm using a training data set comprising employee prestige scores for a plurality of entities not including a first entity and labeled with a degree of success of the plurality of entities;

accessing member profiles of a set of one or more members of the computer-based service, each member of the set of one or more members indicating in their respective member profiles that they work for a first entity;

calculating an employee prestige score for each respective member in the set based upon an educational institution attended by the respective member and past work experience attained by the respective member, the educational institution and past work experience determined based upon a respective member profile of the respective member;

calculating an entity potential score for the first entity using the employee prestige scores of the employees in the set as input to the trained model, the entity potential score quantifying a predicted likelihood that the first entity meets predetermined entity successfulness criteria;

receiving, through a GUI, a search request, the search request including a request for entities meeting an entity potential score criterion;

determining that the entity potential score of the first entity meets the entity potential score criterion;

providing the entity as part of a GUI displaying entities matching the entity potential score criterion; and wherein calculating the employee prestige score for each respective member in the set based upon the educational institution attended by the respective member and the past work experience attained by the respective member comprises, for each respective member in the set:

determining an educational prestige score based upon point values specified for one or more educational institutions that the respective member reports having attended;

determining a previous work experience prestige score as the maximum work experience prestige score over a plurality of entities that the respective member has worked for; and determining the employee prestige score for the respective member based upon the educational prestige score and the previous work experience prestige score.

11. The system of claim 10, wherein the set of one or more members of the network accessible computer-based service includes all members of the network accessible computer-based service that indicate in their respective member profiles that they work for the first entity.

12. The system of claim 10, wherein the operations of determining the educational prestige score based upon point values specified for one or more educational institutions that the respective member reports having attended comprises:

determining the educational prestige score for the first member as the maximum educational prestige score over a plurality of educational institutions that the respective member has attended.

13. The system of claim 10, wherein the operations of calculating the entity potential score for the first using the employee prestige scores of the employees in the set as input to the trained model comprises:

utilizing an average of the employee prestige scores of all the employees in the set as input to the model.

14. The system of claim 10, wherein the operations of calculating the entity potential score for the first entity using the employee scores of the employees in the set as input to the trained model comprises: utilizing a funding source that is funding the entity as input to the model.

15. The system of claim 10, wherein the predetermined entity successfulness criteria comprises growth in at least one of: revenue, profits, or number of employees.

* * * * *

UNITED STATES PATENT AND TRADEMARK OFFICE
CERTIFICATE OF CORRECTION

PATENT NO. : 10,600,029 B2
APPLICATION NO. : 15/339541
DATED : March 24, 2020
INVENTOR(S) : Wang et al.

Page 1 of 1

It is certified that error appears in the above-identified patent and that said Letters Patent is hereby corrected as shown below:

In the Claims

In Column 17, Line 65, in Claim 2, delete "fit" and insert --first-- therefor

In Column 20, Line 42, in Claim 13, after "first", insert --entity--

In Column 20, Line 50, in Claim 14, after "comprises:", insert --¶--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*